US011755149B1

(12) United States Patent
Maharramov et al.

(10) Patent No.: US 11,755,149 B1
(45) Date of Patent: Sep. 12, 2023

(54) SYSTEMS AND METHODS FOR USING STATISTICAL INFERENCE TO ENHANCE THE PRECISION OF SPARSIFIED CAPACITIVE-TOUCH AND OTHER HUMAN-INTERFACE DEVICES

(71) Applicant: Samsung Electronics Company, Ltd., Suwon-si (KR)

(72) Inventors: Musa Maharramov, The Woodlands, TX (US); Mohammad J. Abu Saude, Sunnyvale, CA (US); William Augustus Workman, San Francisco, CA (US); Dean N. Reading, Sunnyvale, CA (US); Marc Estruch Tena, San Jose, CA (US); Sergio Perdices-Gonzalez, Sunnyvale, CA (US)

(73) Assignee: Samsung Electronics Co., Ltd., Suwon si (KR)

( * ) Notice: Subject to any disclaimer, the term of this patent is extended or adjusted under 35 U.S.C. 154(b) by 0 days.

(21) Appl. No.: 17/723,325

(22) Filed: Apr. 18, 2022

(51) Int. Cl.
*G06F 3/041* (2006.01)
*G06F 3/044* (2006.01)
*G06F 3/045* (2006.01)

(52) U.S. Cl.
CPC .......... *G06F 3/04186* (2019.05); *G06F 3/044* (2013.01); *G06F 3/04166* (2019.05); *G06F 3/045* (2013.01)

(58) Field of Classification Search
CPC .. G06F 3/04186; G06F 3/04166; G06F 3/044; G06F 3/045
See application file for complete search history.

(56) References Cited

U.S. PATENT DOCUMENTS 9,606,656 B2 3/2017 Yeh
9,703,473 B2 7/2017 Schillings
9,753,579 B2 9/2017 Johansson
9,933,883 B2 4/2018 Kim
2011/0285654 A1* 11/2011 Park .................... G06F 3/04182 345/173
2015/0109244 A1* 4/2015 Jang ...................... G06F 3/0446 345/174
2015/0212609 A1* 7/2015 Tung ..................... G06F 3/0446 345/174
2017/0123586 A1* 5/2017 Gunawardana ..... G06F 3/04186
2019/0310738 A1 10/2019 Dyvik
2020/0064960 A1* 2/2020 Munemoto ......... G06F 3/04883
2021/0191598 A1* 6/2021 Lim .................... G06F 3/04883

* cited by examiner

*Primary Examiner* — Hong Zhou

(57) ABSTRACT

In one embodiment, a method includes by an electronic device: receiving sensor data indicative of a touch input from sensors of a human interface-device (HID) of the electronic device, where the touch input occurs at a set of actual coordinates with respect to the HID, and where the sensor data indicates the touch input occurs at a set of detected coordinates with respect to the HID, determining a context associated with the touch input, determining, by one or more generative models, context-dependent statistics to apply a delta change to the set of detected coordinates, where the context-dependent statistics are based on the context associated with the touch input, and where the one or more generative models comprises one or more system parameters and one or more latent parameters, and determining a set of time-lapsed predicted coordinates of the touch input with respect to the HID based on the delta change.

20 Claims, 15 Drawing Sheets

1000

SYSTEMS AND METHODS FOR USING STATISTICAL INFERENCE TO ENHANCE THE PRECISION OF SPARSIFIED CAPACITIVE-TOUCH AND OTHER HUMAN-INTERFACE DEVICES

TECHNICAL FIELD

This disclosure relates generally to display technology, and in particular sensors in a human-interface device.

BACKGROUND

Current touch input technologies become expensive when scaled to large surfaces or non-flat applications, such as large-scale non-flat (e.g., curved) TVs. Most of the touch-screen technologies are manufactured onto a rigid glass substrate using a multi-layered, row-column matrix using high conductive material such as ITO. Therefore, the cost for large touch screens is high. In addition, there is a lack of flexible and non-flat (or irregular shaped) touch capability surfaces.

DESCRIPTION OF EXAMPLE EMBODIMENTS

Machine-Learning System Overview

Figure 1:
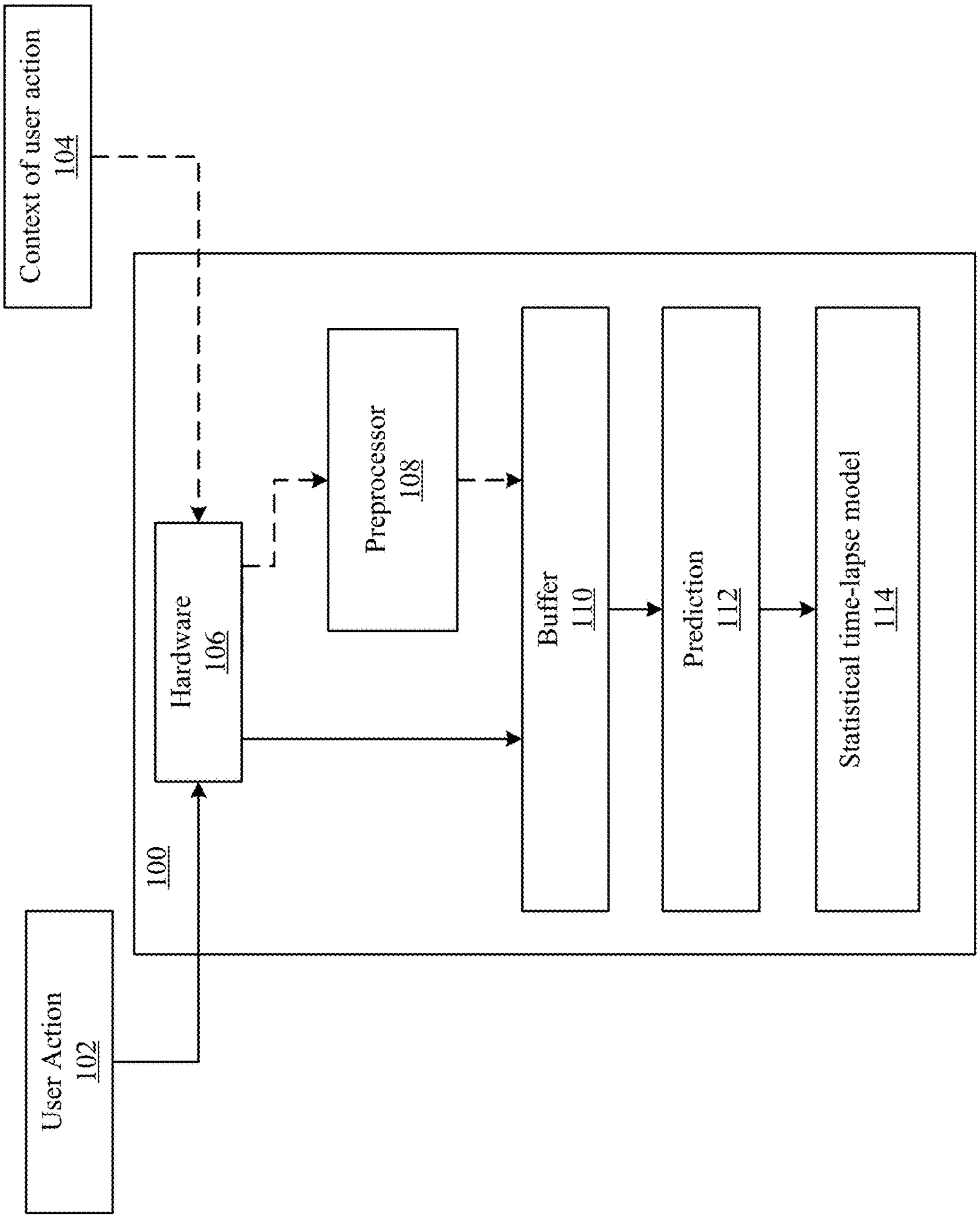
FIG. 1 illustrates an example machine-learning system.

FIG. 1 illustrates an example prediction system 100. As depicted by FIG. 1, the prediction system 100 may include hardware 106, a preprocessor 108, a buffer 110, a prediction block 112, and a statistical time-lapse model 114. In particular embodiments, one or more components of the prediction system 100 can include a computing engine. As an example and not by way of limitation, the statistical time-lapse model 114 can include a computing engine. The prediction system 100 may be used to accurately predict actual coordinates of a touch input. Additionally, the prediction system 100 may be utilized to process and manage various analytics and/or data intelligence such as predicting the actual coordinates of a touch input, and so forth. In particular embodiments, the prediction system 100 can include a cloud-based cluster computing architecture, client-based computing architecture, or other similar computing architecture that may receive a user action 102 where a context 104 is associated with the user action. In particular embodiments, the user action 102 can include one or more of a touch action, gesture action, haptic action, and the like. In particular embodiments, the context 104 of the user action can include one or more of an environment, type of activity, and the like. In particular embodiments, the context 104 may not be explicitly measured, but may impact the measurement of the user action 102. As an example and not by way of limitation, the user action 102 may correspond to a set of touch coordinates (e.g., a detected X-coordinate and a detected Y-coordinate). The context 104 may affect the set of touch coordinates (e.g., apply a delta to one or both of the detected X-coordinate and the detected Y-coordinate).

In particular embodiments, the context 104 may include information corresponding to one or more system parameters and one or more latent parameters. The system parameters may include one or more of raw or processed sensor data. Latent parameters may include one or more known latent parameters and one or more unknown latent parameters. As an example and not by way of limitation, the latent parameters may include one or more of environmental conditions, device locations, event times, etc. Each of these example latent parameters may either be known latent parameters or unknown latent parameters.

In particular embodiments, the hardware 106 can comprise one or more input devices (e.g., tactile and haptic human-interface devices (HID) technologies, such as touch sensing technologies, acoustic touch panels, 3D hand localization, and the like) as described herein. The hardware 106 can be configured to receive a user action 102 that has a context 104 and output raw electrical signals corresponding to the action $\tilde{d}$. In particular embodiments, the preprocessor 108 may receive the raw electric signals from the hardware 106. In particular embodiments, the preprocessor 108 can process the raw electric signals from the hardware 106 to generate a set of detected coordinates with respect to the HID. For example, the user action 102 may correspond to a set of X-coordinates and a set of corresponding Y-coordinates with respect to the HID. The set of detected coordinates with respect to the HID can correspond to coordinates that are registered by the HID. For example, as a result of one or more sensor placements within the HID, the detected coordinate corresponding to a touch input may not be the same as an actual coordinate corresponding to the user action 102 (e.g., a touch input). This may be the result of one or more factors related to HID design, regime of operation, or its operating environment expressed as coherent and incoherent noise.

In particular embodiments, the hardware 106 can send the raw electrical signals, $\tilde{d}$ to the buffer 110. In particular embodiments, the buffer 110 can receive the preprocessed raw signals, d from the preprocessor 108. In particular embodiments, if the buffer 110 receives raw electrical signals, $\tilde{d}$ directly from the hardware 106, the buffer may equate $\tilde{d}=d$. In particular embodiments, the buffer 110, may place the raw and/or pre-processed signals in a buffer. The buffer 110 can send the buffered raw and/or pre-processed signals to the prediction block 112. In particular embodiments, the buffer 110 may generate $(d_1, d_2, \ldots, d_N)$ to send to the prediction block 112.

In particular embodiments, the prediction block 112 can generate a time-lapse (dynamic) prediction of the user action

102 from multiple signals using the statistical time-lapse model 114. In particular embodiments, the prediction block 112 can use the buffered raw and/or pre-processed signals $(d_1, d_2, \ldots, d_N)$ to generate the time-lapse (dynamic) prediction of the user action 102 from multiple signals $(x_1, x_2, \ldots, x_N)$. The time-lapse prediction of user action 102 may comprise a set of predicted coordinates, which are an estimate of a set of actual coordinates. In particular embodiments, an output device (not shown) can receive the predicted coordinates. In particular embodiments, the output device can be the HID. The output device can display the predicted coordinates on the HID.

Statistical Inference to Enhance the Precision of Sparsified Capacitive-Touch and Other Human-Interface Devices In particular embodiments, an electronic device comprising a sparsified sensor structure can use statistical inference to enhance the precision of the sparsified sensor structure. Current touch input technologies may become expensive when scaled to large surfaces or non-flat applications, such as large-scale non-flat (e.g., curved) TVs. Most of the touch input technologies may be manufactured onto a rigid glass substrate using a multi-layered, row-column matrix using high conductive material such as ITO. Therefore, the cost for large touch screens is high. In addition, there may be a lack of flexible and non-flat (or irregular shaped) touch capability surfaces.

In particular embodiments, to address the issues associated with scalability and unconventional surface shapes, sparsified sensor designs or structures may be used to improve the cost analysis of the resulting capacitive-touch devices. As used herein, "sparsified sensor structure or design" may refer to a sensor structure or sensor design implemented within an HID, such as a touchscreen, where one or more sensors are spaced apart at least a threshold distance from each other. In particular embodiments, the sparsified sensor structure can comprise sets of sensors that are spaced apart at least a threshold distance from each other. As an example and not by way of limitation, a set of sensors of the HID may be positioned in a pattern on the HID, such as a stripe pattern. Although this disclosure describes sparsified sensor structures in a particular manner, this disclosure contemplates sparsified sensor structures in any suitable manner.

Certain technical challenges exist for implementing sparsified sensor structures in a HID. One technical challenge may include a degradation of accuracy of the touch location. The solution presented by the embodiments disclosed herein to address this challenge may be to use one or more generative models that comprise one or more system parameters and one or more latent parameters, where the one or more generative models are used to determine context-dependent statistics to apply a delta change to a set of detected coordinates to determine a set of predicted coordinates. Another technical challenge may include signal hysteresis at an onset and termination of touching and similar non-stationarity in continuous-touch scenarios when using a sparsified sensor structure in a HID. The solution presented by the embodiments disclosed herein to address this challenge may be using a buffer to store sensor data, where the buffer is used to remove signal noise associated with a set of detected coordinates form the sensor data.

Certain embodiments disclosed herein may provide one or more technical advantages. A technical advantage of the embodiments may include time-lapse coordinate prediction informed by physics of HID and tactile devices. Another technical advantage of the embodiments may include time-lapse coordinate prediction informed by learned and recognizable patterns of user behavior. Another technical advantage of the embodiments may include a processing methodology that can be adapted to and combined with existing coordinate estimation algorithms and pipelines used in tactile and haptic HID to enhance the accuracy of their output. Another technical advantage of the embodiments may include a processing methodology that could infer non-stationary and spatially-variable statistics of the raw data and sensor output to produce enhanced-precision touch detection and location for sparsified capacitive and capacitive/resistive touch-screen HIDs. Certain embodiments disclosed herein may provide none, some, or all of the above technical advantages. One or more other technical advantages may be readily apparent to one skilled in the art in view of the figures, descriptions, and claims of the present disclosure.

In particular embodiments, $d_1, \ldots, d_N=(d_1^i, d_2^i, \ldots, d_N^i)$, $i=1, 2, \ldots, M$ (1) can be a sequence of raw or processed temporal data samples including, without limitation, raw or processed system parameters, such as readings of voltage and/or current taken at the terminals of a capacitive/resistive tactile or haptic human-interface device. Such devices include, without limitation, any human-interface device that internally captures tactile, haptic, or gestural human input in the form of M-component electrical signals. The readings may be taken at equally or unequally spaced, known or unknown, times $t_1, \ldots, t_N$, and each M-dimensional electrical signal $d_j$ corresponds to a 3-component data sample $x_j$ that can be interpreted as the spatial location of human input: $x_1, \ldots, x_N=(x_1^i, x_2^i, \ldots, x_N^i)$, $i=1, 2, 3$. (2)

In particular embodiments, a system and method for estimating the actual coordinates of human input (2) from raw or processed data samples (1) for a capacitive/resistive tactile, haptic or other human interface device (HID) can be generally described by a statistical model of the following form: $d_i \sim p(d_i | x_i, x_{i-i}, \ldots, x_{i-n+1}, \Delta)$. (3)

In equation (3), p can be a conditional probability distribution that describes the distribution of system parameters at a moment $t_i$ as a function of current and previous actual coordinates of human input. The parameter n may describe system hysteresis, i.e., dependence of its current state on its history. For example, in the context of capacitive tactile devices, the previous relative position of tactile interfaces (e.g., the air gap between the touchscreen and stylus) may impact the strength and quality of the current raw signal $d_i$. There may exist a vector of latent variables A, known or unknown parameters, that, in conjunction with a set of system parameters (raw or processed signal readings) $d_i, d_{i-1}, \ldots d_{i-n+1}$, uniquely determines the system's current state at moment $t_i$. For multi-point tactile interfaces, some or all of $t_i$ may be the same.

In particular embodiments, the actual coordinates $(x_i, \ldots, x_{i-K+1})$ at one or more consecutive moments of time $(t_i, \ldots, t_{i-K+1})$ can be predicted by sampling from an estimated stochastic model $(x_i, \ldots, x_{i-K+1}) \sim \tilde{p}(d_i, d_{i-1}, \ldots d_{i-L+1}, \lambda)$, (4) where $\tilde{p}$ may be a probability distribution for a vector of actual coordinates given a history of system parameters (raw readings) $d_i, d_{i-1}, \ldots d_{i-L+1}$ and a set of latent, known or unknown system parameters $\tilde{\lambda}$. Parameters K and L implicitly depend on system hysteresis, and are either selected empirically, or estimated as part of stochastic model training described below. In most cases of practical interest, p and $\tilde{p}$ may not be known in a closed form and require to be estimated by training a suitable statistical model of the device.

In particular embodiments, real-time statistical coordinate inference may be used. A generative model described by a nonlinear maximum a-posteriori map $F:\tilde{\lambda}, d_i, d_{i-1}, \ldots d_{i-L+1} \rightarrow x_i, \ldots, x_{i-K+1} \leftrightarrow x_j^i = \operatorname{argmax} \tilde{p}(x_i|d_i, d_{i-1}, \ldots d_{i-L+1}, \tilde{\lambda})$, (5) and parametrized by parameters $\tilde{\lambda}$. Likewise, F can be a sampling map, in which case $\tilde{\lambda}$ may contain both non-random and random components. For example, the map (5) can be component-wise comprised of, without limitation, linear, polynomial, spline, or any other feature-space mappings $\phi_{sj}^i(d_i, d_{i-1}, \ldots d_{i-L+1})$ with coefficients or weights making up (a subset of) the vector $\tilde{\lambda} \in (c_{sj}^i)$:

$$x_j^i = \Sigma_s c_{sj}^i \phi_{sj}^i(d_i, d_{i-1}, \ldots d_{i-L+1}), \tilde{\lambda} = (c_{sj}^i),\ i=1, 2, 3,\ j=i, i-1, \ldots, i-L+1,\ s=1, 2, \ldots, N_b. \quad (6)$$

Figure 7:
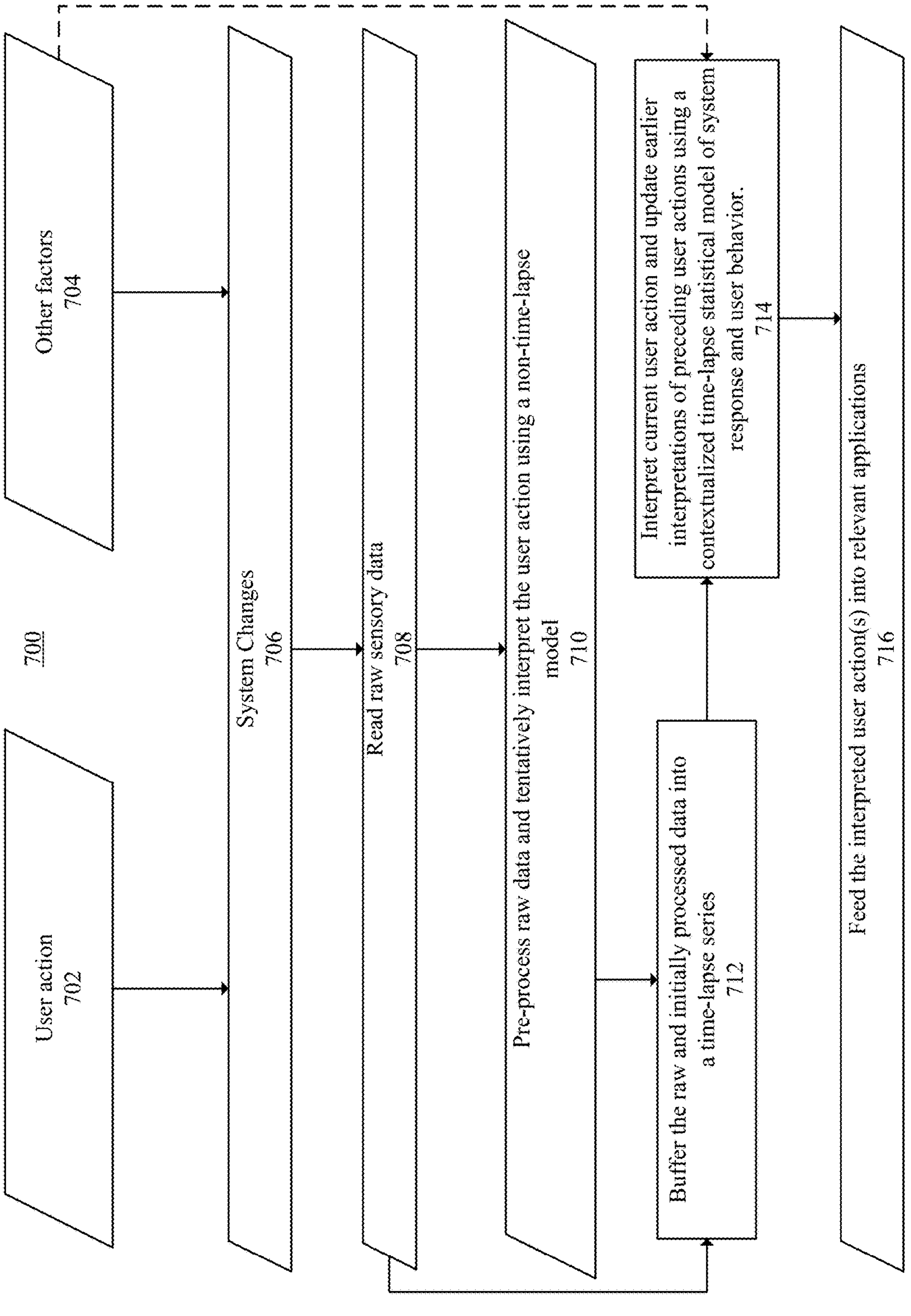
FIG. 7 illustrates an example process flow of a human-interface device.

Next, the model (6) may be trained—i.e., identify its parameters $\tilde{\lambda}$ using generated training samples of raw or processed readings $d_i$, $d_{i-1}$, $d_{i-L+1}$ and the corresponding actual coordinates $x_i, \ldots, X_{i-K+1}$. The parameter estimation may be conducted by adjusting the parameters to minimize a measure of misfit between the predicted $F(\tilde{\lambda}, d_i, d_{i-1}, d_{i-L+1})$ and observed coordinates $x_i, \ldots, X_{i-K+1}$. The resulting estimated parameters $\tilde{\lambda}$ and map (5) are then implemented in a built-in computational unit of an HID and used for real-time prediction/sampling of $x_i, \ldots, X_{i-K+1}$ given $d_i, d_{i-1}, \ldots d_{i-L+1}$. Parameters $\tilde{\lambda}$ may include latent variables that express the model's sensitivity to unmeasured mutable external factors, such as environmental conditions, device locations, event times, etc. such as shown in FIG. 7.

In particular embodiments, the proposed algorithm can be implemented as an "inference processor" in a built-in controller of a device that utilizes a human interface technology (such as, without limitation, a touchscreen). The inference may be applied to buffered raw and/or pre-processed data that form a time-lapse series. In addition to utilizing time-lapse input data, the statistical model of system response and user behavior can capture the system's dependence on the context in which the device is being operated (e.g., environmental or behavioral factors) via explicit and/or latent model parameters $\tilde{\lambda}$ described in equations (4-6) above.

In particular embodiments, the system may allow potentially very complex and analytically intractable statical relations between the actual coordinates of human input and internal device readings. The use of potentially very complex and analytically intractable statical relations may allow for using sparsified or otherwise constrained sensor architectures that may be more sensitive to spurious signals, prone to hysteresis, and require complex statistical model of system response. Additionally, by allowing arbitrary feature-space functions (6), the full apparatus of kernel methods and random processes can be leveraged.

In particular embodiments, the map (5) can be described, without limitation, by a neural network, with the parameter vector $\tilde{\lambda}$ now representing its weights, biases, and both estimated and random latent variables. The network in question can be, without limitation, a convolutional neural network, a deep or restricted Boltzmann Machine, a shallow or deep network. This further increases the capacity of the generative model (5) and leverages the well-developed apparatus of deep learning.

While the raw data samples (1) are generally assumed to be representative of the device's internal parameters (e.g., voltage readings at terminal electrodes), in particular embodiments, where the data samples (1) are themselves outputs of an independent processing algorithm, such as, without limitation, the neural network-based coordinate prediction algorithm and processing pipeline. In such a case, one or more algorithms can function as a post-processing step, implemented on top of an existing single or multiple touch prediction framework.

While the training procedure of particular embodiments do not restrict the type and quantity of input $d_i, d_{i-1}, \ldots d_{i-L+1}$ and output $x_i, \ldots, X_{i-K+1}$ training samples, additional contextual information, such as continuity or discontinuity of the corresponding strokes generated by an automated data collection system, as well as additional system characteristics such as the subsystem or part of the device where the data collection is performed, can provide additional constraints on system latent variables.

In particular embodiments, a generative model (4,5,6) can be used where the feature-space function are splines, and component-wise spatially heterogeneous coordinate variances $\sigma_i^2$ are part of the resolved system parameter vector $\tilde{\lambda} = (c_{sj}^i, \sigma_i^2(x_j^i))$.

The statistical model $x_j^i \sim N(\Sigma_s c_{sj}^i \phi_{sj}^i(d_i, d_{i-1}, \ldots d_{i-L+1}); \sigma_i^2(x_j^i))$, i=1, 2, 3, j=i, i−1, . . . i−L+1, s=1, 2, . . . , $N_b$. (7) may assume normally distributed (p=N) coordinate readings. However, in particular embodiments, the statistical model (7) may naturally extend to arbitrary analytical, parametrized, or otherwise computable probability distributions p. Note that the spatially-variable variances $\sigma_i^2(x_j^i)$ represent in this case latent dependency of system response on physical location of touch events (e.g., closer to the edges versus middle of the touchscreen), making up the latent part of the vector $\tilde{\lambda}$ as discussed after equation (6) and in FIG. 7.

In particular embodiments, the electronic device (e.g., an electronic device coupled with the prediction system 100) may receive sensor data indicative of a touch input from one or more sensors of a human interface-device (HID). As an example and not by way of limitation, a user may use one of a finger or stylus to touch the HID, such as a touchscreen display. The touch input may occur at a set of actual coordinates with respect to the HID. The sensor data may indicate the touch input occurs at a set of detected coordinates with respect to the HID, where the set of detected coordinates may be different from the set of actual coordinates. In particular embodiments, the electronic device may store the sensor data in a buffer. As an example and not by way of limitation, the electronic device can store sensor data within a 100 ms buffer. The buffer can be used to remove signal noise associated with the set of detected coordinates from the sensor data. The context may be determined based on the stored data. In particular embodiments, the one or more sensors of the HID may be positioned in a pattern on the HID. In particular embodiments, the pattern may comprise a stripe pattern. A first subset of sensors of the one or more sensor may be positioned at least a threshold distance away from a second subset of sensors of the one or more sensors. In particular embodiments, the first subset of sensors and the second subset of sensors may be positioned along parallel lines with respect to the HID. In particular embodiments, the one or more sensors can comprise one or more of a capacitive sensor or a resistive sensor. Although this disclosure describes receiving sensor data in a particular manner, this disclosure contemplates receiving sensor data in any suitable manner.

In particular embodiments, the electronic device may determine a context associated with the touch input. To determine the context associated with the touch input, the electronic device may use one or more sensors of a HID, access a context database for information corresponding to the HID, or access information through one or more of first-party sources or third-party sources as described herein. In particular embodiments, the context can comprise information corresponding to one or more of system parameters and latent parameters. Although this disclosure describes determining a context in a particular manner, this disclosure contemplates determining a context in any suitable manner.

In particular embodiments, the electronic device may determine context-dependent statistics to apply a delta change to the set of detected coordinates. The electronic device may use one or more generative models to determine the context-dependent statistics to apply the delta change to the set of detected coordinates. The context-dependent statistics may be based on the context associated with the touch input. The one or more generative models may comprise one or more system parameters and one or more latent parameters. In particular embodiments, the each of the one or more generative models may be a machine-learning model. Although this disclosure describes determining context-dependent statistics in a particular manner, this disclosure contemplates determining context-dependent statistics in any suitable manner.

In particular embodiments, the electronic device may determine a set of predicted coordinates of the touch input with respect to the HID. The electronic device may determine a set of time-lapsed predicted coordinates of the touch input with respect to the HID based on the delta change. As an example and not by way of limitation, the electronic device may adjust the set of detected coordinates by the delta change to determine the set of time-lapsed predicted coordinates. The set of time-lapsed predicted coordinates may be an estimate of the set of actual coordinates. In particular embodiments, the electronic device may display, on the HID, an indication of the set of time-lapsed predicted coordinates of the touch input in real-time. As an example and not by way of limitation, as a user is touching a HID of an electronic device, the electronic device may determine the set of time-lapsed predicted coordinates corresponding to the touch input and display the set of time-lapsed predicted coordinates on the HID. Although this disclosure describes determining a set of predicted coordinates in a particular manner, this disclosure contemplates determining a set of predicted coordinates in any suitable manner.

In particular embodiments, the electronic device may generate the sensor data. The electronic device may inject a plurality of signals into the one or more sensors. The plurality of signals may comprise at least a first signal at a first frequency and a second signal at a second frequency. As an example and not by way of limitation, the electronic device may inject a signal at a first frequency in one source electrode and inject a signal at a second frequency in another source electrode. In particular embodiments, the electronic device may detect, by the one or more sensors, a plurality of attenuated measured signals based on the touch input interfacing the plurality of signals. A read electrode may be placed in between the two source electrodes. As the electronic device receives the touch input via the HID, the plurality of signals (that are injected by the electronic device) are attenuated. The electronic device may use the read electrode to detect the attenuated measured signals. The plurality of attenuated measured signals may be used to generate the sensor data. Although this disclosure describes generating sensor data in a particular manner, this disclosure contemplates generating sensor data in any suitable manner.

Figure 2:
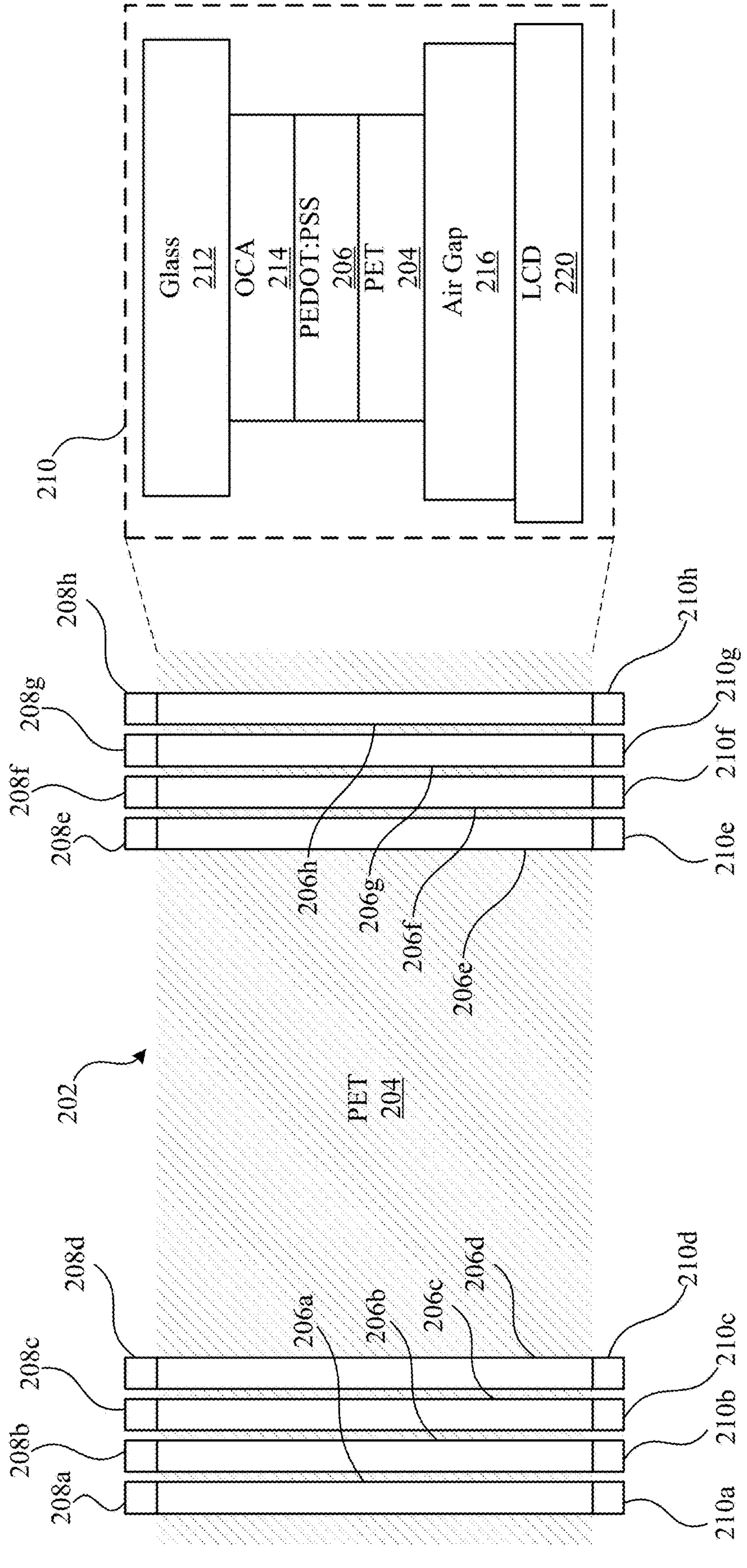
FIG. 2 illustrates an example display with a sparsified sensor structure.

FIG. 2 illustrates an example display 202 with a sparsified sensor structure. In particular embodiments, the display 202 can comprise a polyethylene terephthalate (PET) substrate 204 coated with resistive material, poly (3,4-ethylenedioxythiophene) polystyrene sulfonate (PEDOT:PSS) 206 in a pattern, such as stripes. In particular embodiments, the coating may be applied using a mask or laser itching after a uniform coating. In particular embodiments, each of the resistive materials 206 can be coupled with a pair of electrodes 208, 210. Each resistive material 206 coupled with a pair of electrodes 208, 210 can be a sensor. As an example and not by way of limitation, the resistive material 206*a* is coupled to a first electrode 208*a* and a second electrode 210*a*. As another example and not by way of limitation, the resistive material 206*b* is coupled to a first electrode 208*b* and a second electrode 210*b*. As another example and not by way of limitation, the resistive material 206*c* is coupled to a first electrode 208*c* and a second electrode 210*c*. As another example and not by way of limitation, the resistive material 206*d* is coupled to a first electrode 208*d* and a second electrode 210*d*. As another example and not by way of limitation, the resistive material 206*e* is coupled to a first electrode 208*e* and a second electrode 210*e*. As another example and not by way of limitation, the resistive material 206*f* is coupled to a first electrode 208*f* and a second electrode 210*f* As another example and not by way of limitation, the resistive material 206*g* is coupled to a first electrode 208*g* and a second electrode 210*g*. As another example and not by way of limitation, the resistive material 206*h* is coupled to a first electrode 208*h* and a second electrode 210*h*. In particular embodiments, the resistive materials 206*a*-206*d* and the respective electrodes 208*a*-208*d*, 210*a*-210*d* can be grouped into a first subset of sensors and the resistive materials 206*e*-206*h* and the respective electrodes 208*e*-208*h*, 210*e*-210*h* can be grouped into a second subset sensors. The two separate subsets can be separated by at least a threshold distance. Each of the resistive materials 206 and their respective electrodes 208, 210 can be separated from each other by a predetermined distance. While this disclosure shows a particular number of the different components of the display 202 in a particular arrangement, this disclosure contemplates any suitable number of different components of the display 202 in any suitable arrangement. As an example and not by way of limitation, there may be two additional resistive materials 206 and corresponding electrodes in each of the two subsets. As another example and not by way of limitation, each of the subsets can be shaped in a different pattern, such as diagonal stripes (instead of vertical stripes) along the PET substrate 204.

Referring to FIG. 2, a cross-sectional view 210 of the stripe of the display 202 is shown. The cross-sectional view 210 includes a view of the different layers 204, 206, 212, 214, 216, 220 of the stripe of the display 202. The stripe of the display 202 may comprise a glass layer 212, on top of an optically clear adhesive (OCA) layer 214, on top of the resistive material (PEDOT:PSS) 206, on top of the PET substrate 204, on top of an air gap layer 216, and on top of the liquid crystal display (LCD) 220. As an example and not by way of limitation, the glass layer 212 can be 2.8 mm thick and the air gap layer 216 can be 3.2 mm thick. While this disclosure shows a specific number of different components of the stripe of the display 202 arranged in a particular manner, this disclosure contemplates any number of different components of the stripe of the display 202 arranged in any suitable manner. As an example and not by way of limitation, the glass layer 212 can be thicker, such as 3.0 mm. As another example and not by way of limitation, the LCD 220 can be replaced with an organic light-emitting diode (OLED).

Figure 3:
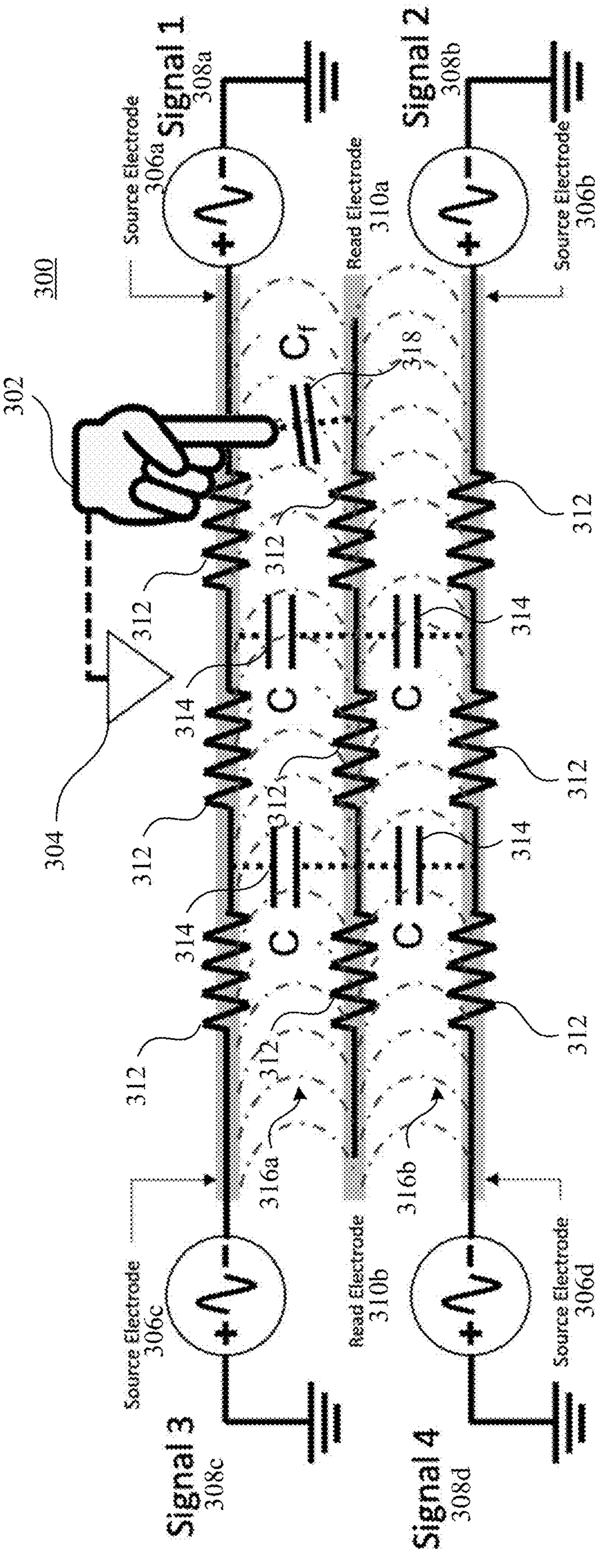
FIG. 3 illustrates an example circuit of a sparsified sensor structure.

FIG. 3 illustrates an example circuit 300 of a sparsified sensor structure. In particular embodiments, a user can touch the circuit 300 using a touch input 302, which would create a path to ground 304. The touch input 302 can be a user's finger. In particular embodiments, the circuit 300 may include source electrodes 306*a*-306*d*, signals 308*a*-308*d*, read electrodes 310*a*-310*b*, resistance 312, capacitance 314, electric fields 316*a*-316*b*, and touch capacitance 318. The source electrodes 306*a* and 306*c* both form a stripe, the read electrodes 310*a* and 310*b* form a stripe, and the source electrodes 306*b*-306*d* form a stripe. The signal variation that is detected when the touch input 302 touches the circuit 300 comes from shunting the electric field 316*a*. In particular embodiments, there are signals 308*a*-308*d* injected into the source electrodes 306*a*-306*d*, respectively. These signals are read using read electrodes 310*a*-310*b* that are adjacent to the source electrodes 306*a*-306*d*. The equivalent circuit of the stripe-TV forms a low pass filter that has a cutoff frequency $$f_c = \frac{1}{2\pi RC}.$$

The injected signal frequencies of the signals 308*a*-308*d* have been chosen to be around the $f_c$ to increase the sensitivity to the touch input 302. When a touch input 302 touches the stripe at a distance d a new capacitance (touch capacitance) is added to the circuit 300. The measured signal will be attenuated. The attenuation can be proportional to the distance between the touch input 302 and the read electrode 310. The circuit 300 can apply different signals 308*a*-308*d* to the stripes, which allow detection of the touch input 302 on, left, or right of the reading stripe that comprises the two read electrodes 310*a*-310*b*. The signals 308*a*-308*d* can each be a single or multiple frequencies.

In particular embodiments, the touch capacitance 318 can vary with touch pressure, finger area, and the like. The measured signals at the read electrodes 310*a*-310*b* can be normalized to eliminate the variations in capacitive effects. As shown in FIG. 3, since the touch input 302 is located in a touch location between the sourcing stripe (that comprises the two source electrodes 306*a*-306*c*) and the reading stripe, the measured signal (e.g., signal 306*a*) will be attenuated more than the other signals 306*b*-306*d*. As a result of the attenuated measured signal (e.g., signal 306*a*), a set of detected coordinates of the touch input 302 can be determined in between the reading stripe and the sourcing stripe. In particular embodiments, the signal frequencies of the signals 308*a*-308*d* may be chosen to be into two different bands (low and high). The low frequencies can travel farther while the high frequencies are more sensitive to the touch input 302. In particular embodiments, the capacitance 318 can have a higher capacitance than the other capacitance 314 in the circuit 300.

Figure 4:
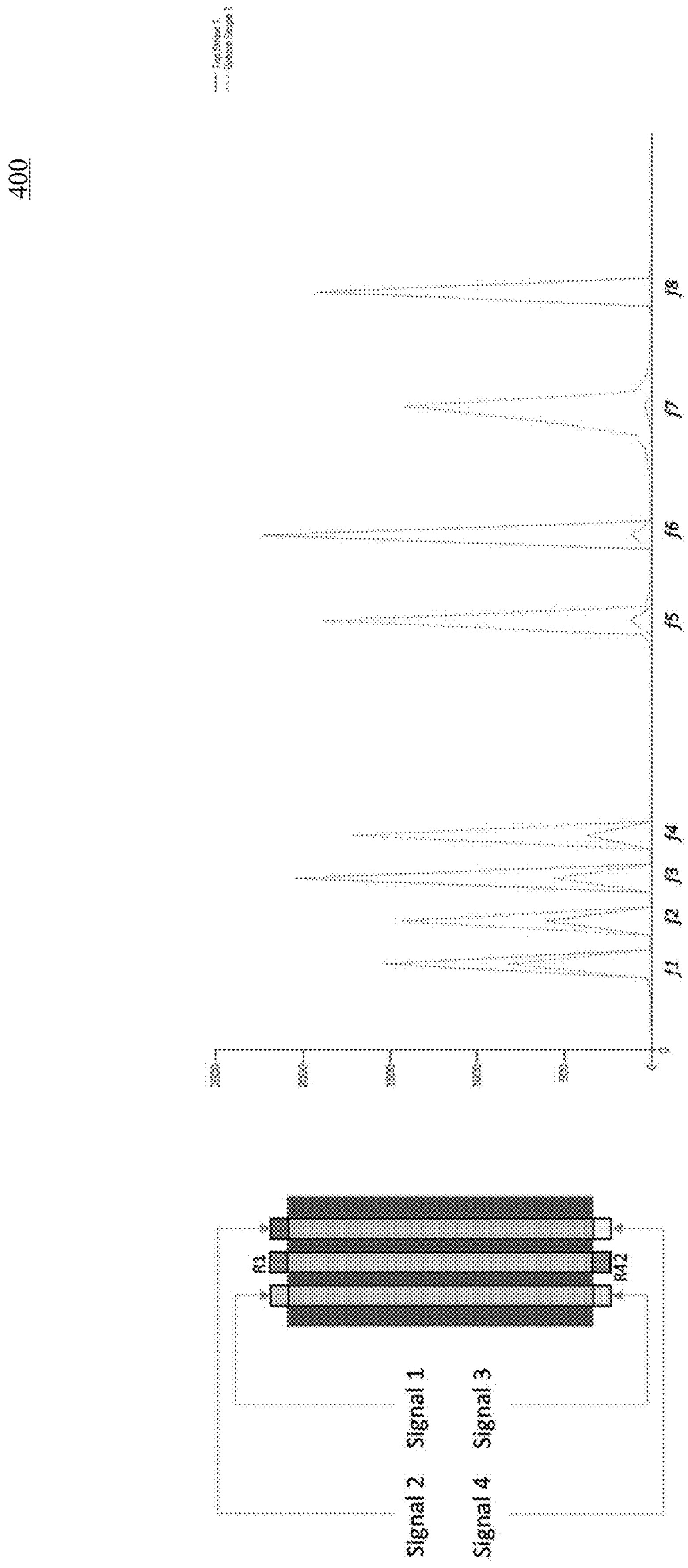
FIG. 4 illustrates an example power spectral density chart of a sparsified sensor structure.

FIG. 4 illustrates an example power spectral density (PSD) chart of a sparsified sensor structure. In particular embodiments, each of the four signals may have two frequencies from the adjacent stripes. The reading stripe may have a modulated signal that contains eight different frequencies. The PSD chart plots the power of a signal as a function of frequency. The solid lines correspond to the top stripe and the dotted lines correspond to the bottom stripe.

Figure 5A:
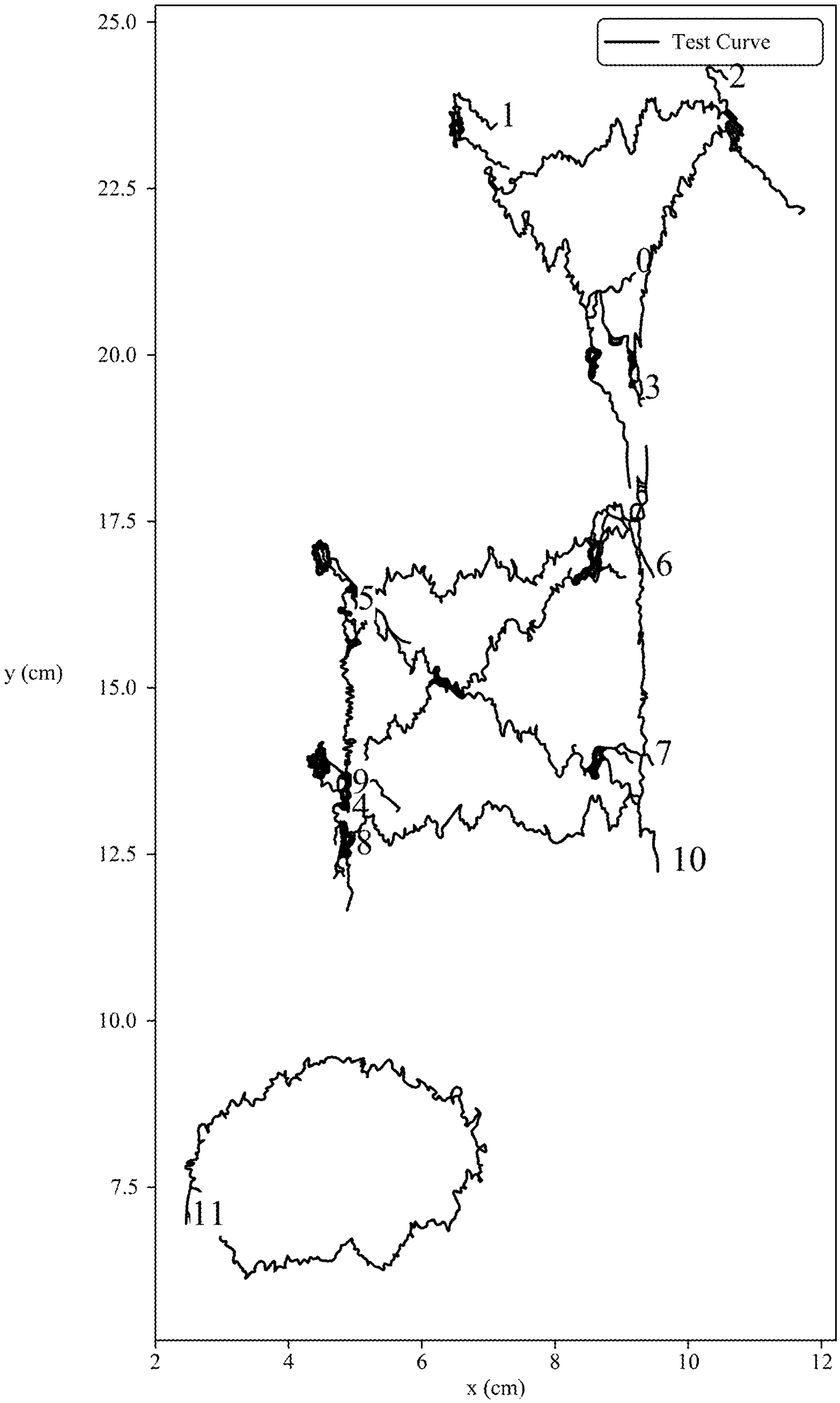
FIG. 5A illustrates an example touch coordinate prediction from touch inputs.
Figure 5B:
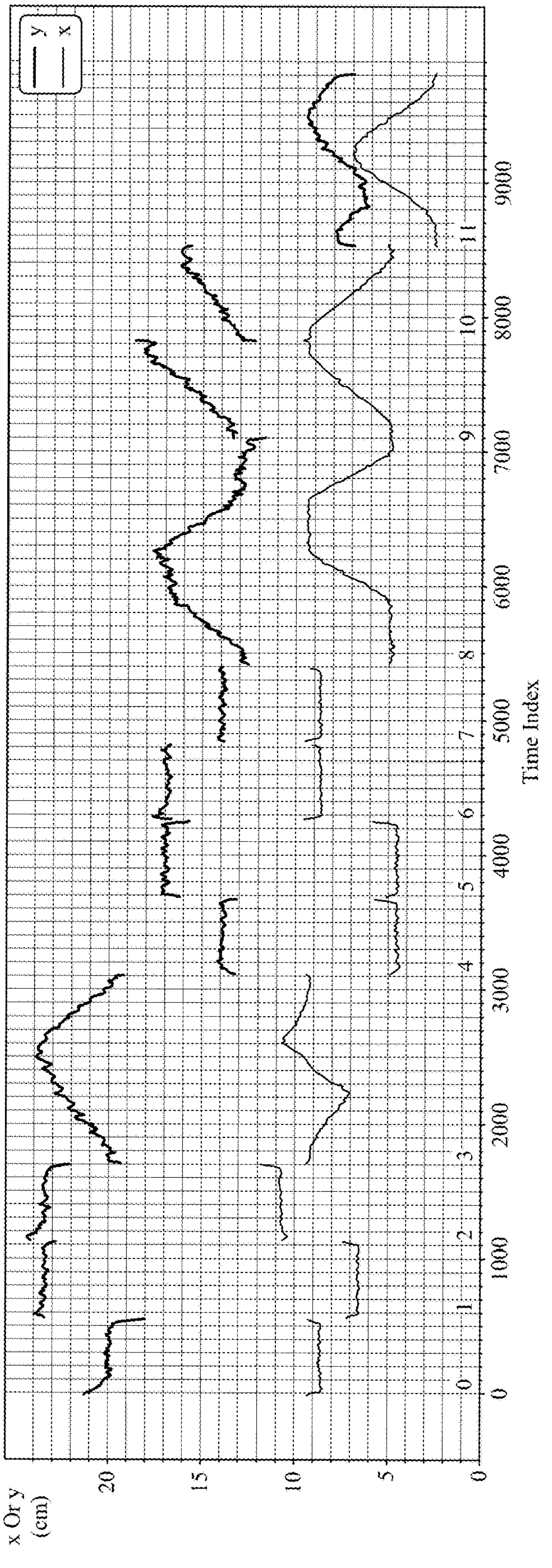
FIG. 5B illustrates an example time series of touch inputs plotted along a time index.

FIG. 5A illustrates an example touch coordinate prediction from touch inputs. In particular embodiments, a set of detected coordinates can be displayed on a HID as shown in FIG. 5A as a result of a user using a touch input on the HID. The numbers illustrated in FIG. 5A can indicate a sequence of touch inputs that the HID received. For example, the first touch input started at "0" where a line is drawn. Referring to FIG. 5B, a chart is shown where a set of detected X-coordinates and detected Y-coordinates are plotted along a time index. The numbers corresponding to the sequence of touch inputs that the HID received are shown along the time index to indicate which touch input the respective X segments and Y segments correspond to. As shown from the chart, there may be a strong vertical variance and hysteresis. The hysteresis is more noticeable near the terminal events of each segment (X and Y segments). FIGS. 5A-5B may illustrate an issue that comes from using an HID with a sparsified sensor structure. That is, the accuracy of the touch location may be degraded.

Figure 6:
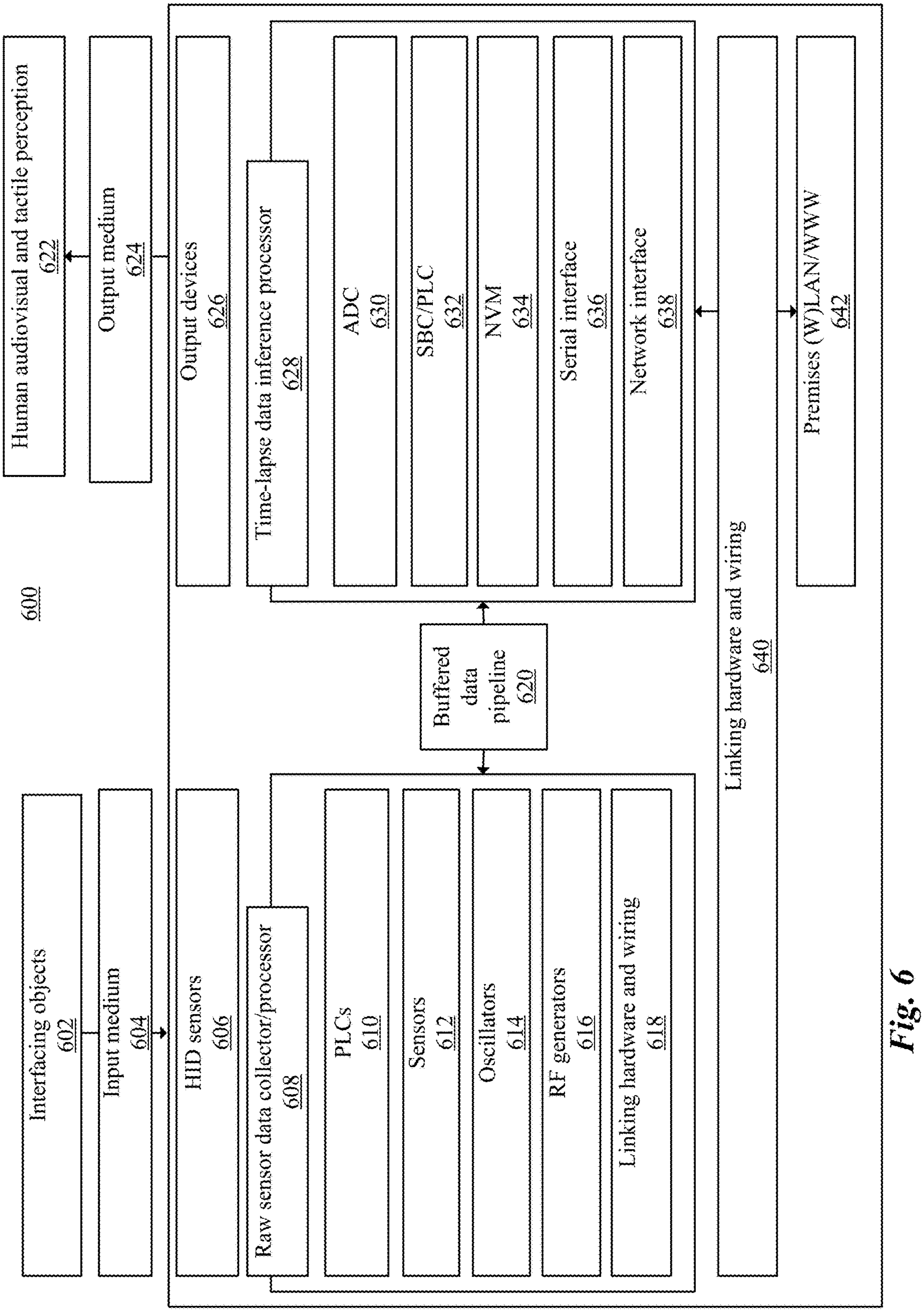
FIG. 6 illustrates an example human-interface device.

FIG. 6 illustrates an example human-interface device (HID) 600. The HID 600 can include interface objects 602, an input medium 604, HID sensors 606, raw sensor data collector/processor, PLCs 610, sensors 612, oscillators 614, RF generators 616, linking hardware and wiring 618, buffered data pipeline 620, human audiovisual and tactile perception 622, output medium 624, output devices 626, time-lapse data inference 628, ADC 630, SBC/PLC 632, NVM 634, serial interface 636, network interface 638, linking hardware and wiring 640, and premises (W)LAN/WWW 642. In particular embodiments, the interfacing objects 602 may include one or more of a finger, stylus for a touchscreen, and RF/optical/acoustic source for haptic HID. The input medium 604 may include a dielectric screen coating, air-gaps. The output medium 624 may include RF/audio waves, tactile/braille display surfaces. The output devices 626 may include audio-visual, tactile displays. The NVM 634 may include EEPROM or Flash. The serial interface 636 may include UART or R5 xxx. The network interface 638 may include IEEE 802.x.

In particular embodiments, the HID 600 can receive a touch input from an interfacing object 602 through input medium 604 with the HID sensors 606. The raw sensor data collector/processor 608 can process the incoming touch input and send it to the buffered data pipeline 620. The buffered data pipeline 620 can send the buffered data to the time-lapse data inference processor 628 which may process the buffered data to determine a set of predicted coordinates based on the received touch input. The time-lapse data inference processor 628 can send the set of predicted coordinates to the output devices 626 to present to a user.

FIG. 7 illustrates an example process flow 700 of a HID to determine a set of predicted coordinates. The process 700 may begin with receiving a user action 702 and other factors 704. The user action 702 can be embodied as a touch input, such as finger/stylus motion and location. The other factors 704 can be embodied as time, environmental factors, device/event location, usage context, operator profile, and the like. The user action 702 and other factors 704 are collected into the system changes 706. The other factors 704 can also be sent to a contextualized time-lapse statistical model. The system changes 706 are then processed to read raw sensory data 708. The raw sensory data 708 can be sent to a buffer 712 and go through pre-processing 710, where the raw sensory data 708 and the user action is tentatively interpreted using a non-time-lapse model. The pre-processing 710 can determine a set of detected coordinates corresponding to the user action 702. The set of detected coordinates may be sent to the buffer 712. The process 700 may then buffer both the raw sensory data 708 and the output of the pre-processing 710 (e.g., initially processed data) into a time-lapse series. The output of the buffer 712 can be sent to the contextualized time-lapse statistical model 714, where the model interprets the current user action (e.g., determine a set of actual coordinates for a touch input) and update earlier interpretations of preceding user actions by using the contextualized time-lapse statistical model 714 of system response and user behavior. The output of the contextualized time-lapse statistical model 714 can be an interpreted user action(s). As an example and not by way of limitation, the output of the contextualized time-lapse statistical model 714 can be a set of predicted coordinates. The process 700 can then feed the interpreted user action(s) into relevant applications 716. As an example and not by way of limitation, the process 700 can then send the interpreted user action(s) to a camera application to add marking to a captured image.

Figure 8A:
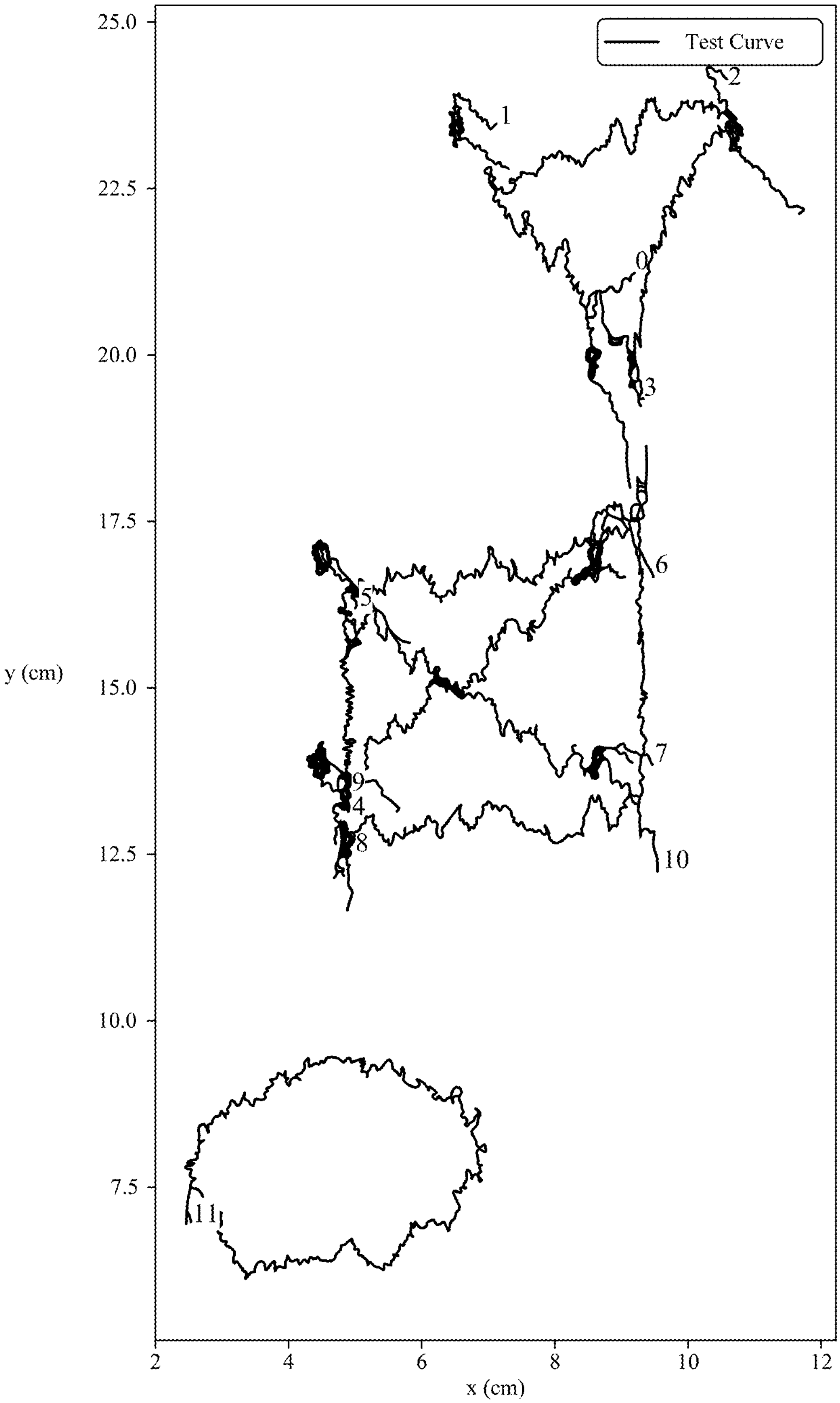
FIGS. 8A-8B illustrate an example process of estimating a set of actual coordinates associated with a touch input.
Figure 8B:
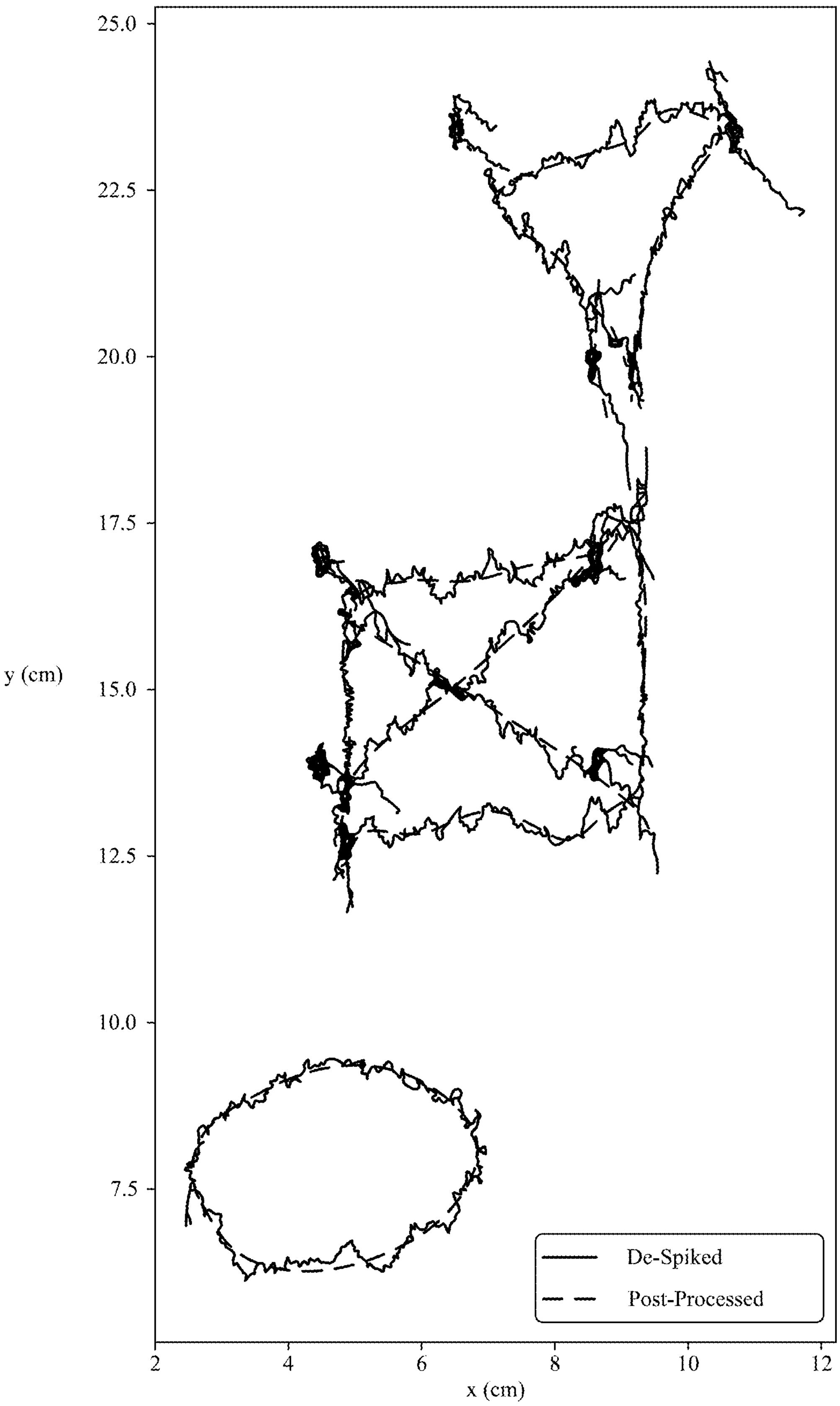

FIGS. 8A-8B illustrate an example process of estimating a set of actual coordinates associated with a touch input. FIG. 8A shows a HID presenting a set of detected coordinates. After processing using the methods and processes described herein, FIG. 8B shows a post-processed output including a set of predicted coordinates. As shown in FIG. 8B, the post-processed output is smoother than the original set of detected coordinates shown in FIG. 8A. In particular embodiments, the HID can perform an inference of the set of actual coordinates from the set of detected coordinates by regression using spline feature-space mappings in a model.

Figure 9B:
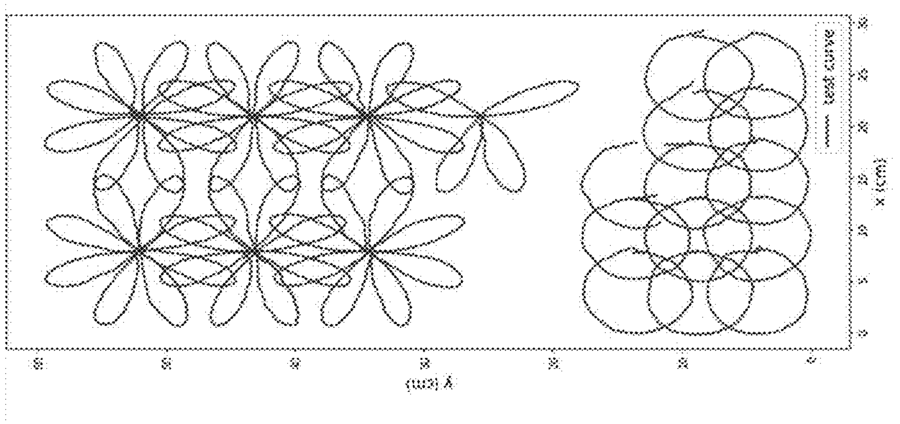
FIGS. 9A-9B illustrate an example post-processing applied to touch inputs.
Figure 9A:
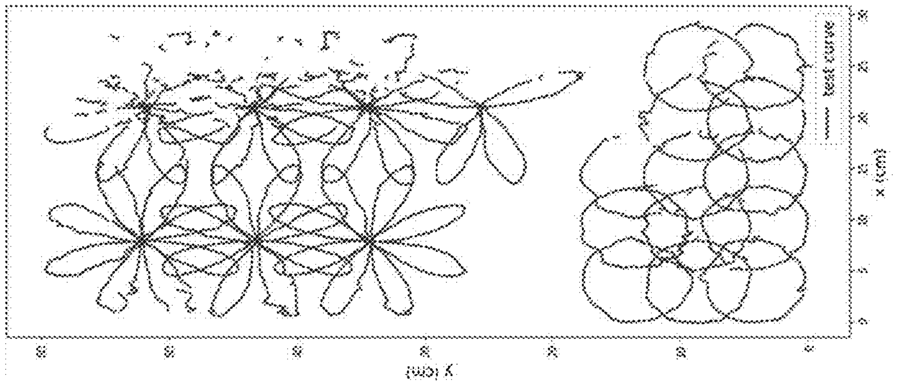

FIGS. 9A-9B illustrate an example post-processing applied to touch inputs. FIG. 9A shows a HID presenting a set of detected coordinates. After processing using the methods and processes described herein, FIG. 9B shows a post-processed output including a set of predicted coordinates. As shown in FIG. 9B, the post-processed output corrects the edge issues of the original set of detected coordinates shown in FIG. 9A. In particular embodiments, the HID can perform an inference of the set of actual coordinates from the set of detected coordinates by allowing for a spatially-variable coordinate variance in a statistical model.

Figure 10:
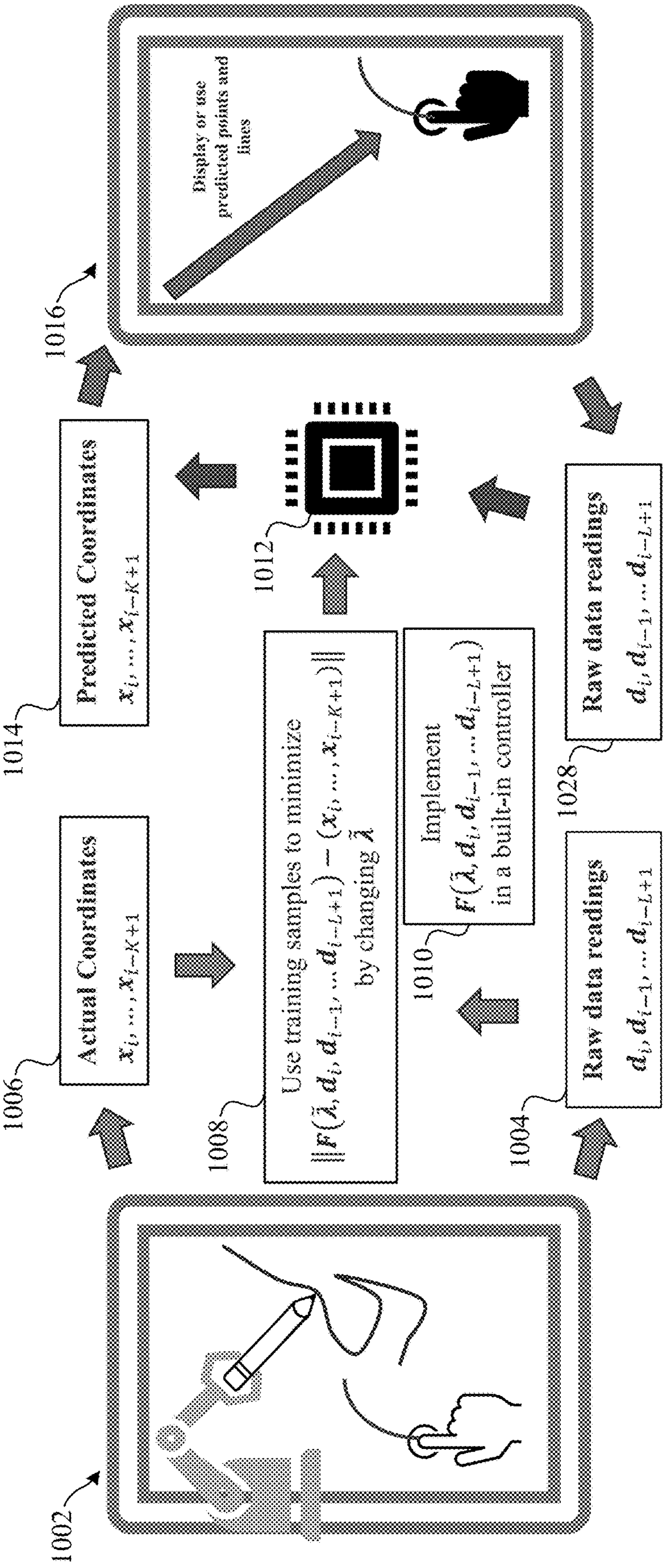
FIG. 10 illustrates an example training process of estimating a set of actual coordinates associated with a touch input.

FIG. 10 illustrates an example training process 1000 of estimating a set of actual coordinates associated with a touch input. The process 1000 can start with manually and automatically generating synthetic time-lapse data 1002. By generating synthetic time-lapse data 1002, the process 1000 can extract both raw data readings 1004 and actual coordinates 1006, which may be sent to be processed by a generative model (5). The generative model (5) may be implemented 1010 into a device's built-in controller 1012, and applied in real time to touch location and prediction. In particular embodiments, the controller 1012 can perform a process 1016 of estimating actual coordinates of a touch input. When raw data readings 1028 are received from an HID, the raw data readings 1028 are sent to controller 1012 to process using the generative model 1010. The controller 1012 can output a set of predicted coordinates 1014, which are outputted to the HID through the process 1016.

Figure 11:
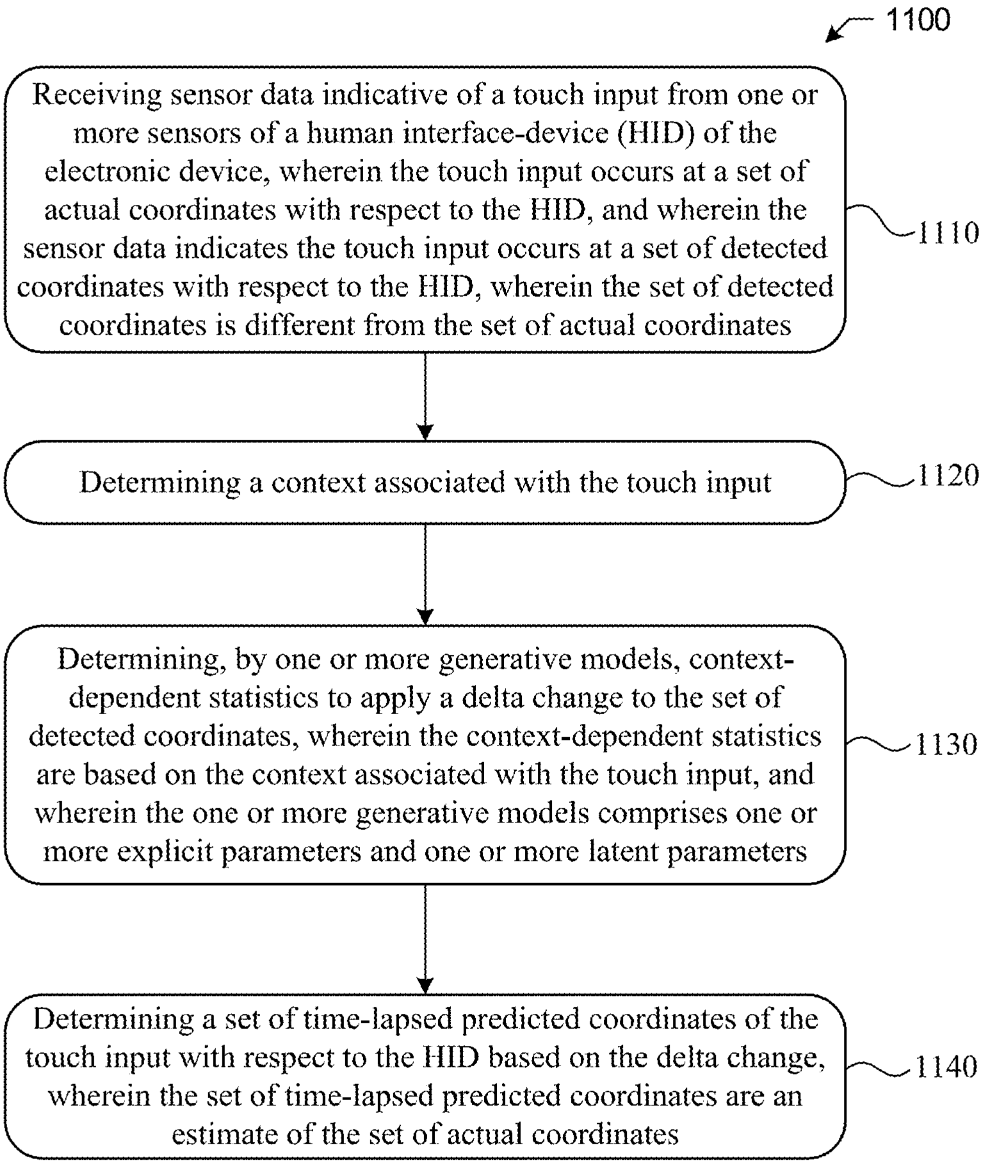
FIG. 11 illustrates an example method for determining a set of predicted coordinates of a touch input.

FIG. 11 illustrates is a flow diagram of a method 1100 for determining a set of predicted coordinates of a touch input, in accordance with the presently disclosed embodiments. The method 1100 may be performed utilizing one or more processing devices (e.g., electronic device coupled with a prediction system 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 1100 may begin at step 1110 with the one or more processing devices (e.g., electronic device coupled with prediction system 100) receiving sensor data indicative of a touch input from one or more sensors of a human interface-device (HID) of the electronic device. For example, in particular embodiments, the touch input may occur at a set of actual coordinates with respect to the HID. The sensor data may indicate the touch input occurs at a set of detected coordinates with respect to the HID. The set of detected coordinates may be different from the set of actual coordinates. The method 1100 may then continue at step 1120 with the one or more processing devices (e.g., electronic device coupled with prediction system 100) determining a context associated with the touch input. The method 1100 may then continue at step 1130 with the one or more processing devices (e.g., electronic device coupled with prediction system 100) determining, by one or more generative models, context-dependent statistics to apply a delta change to the set of detected coordinates. For example, in particular embodiments, the context-dependent statistics may be based on the context associated with the touch input and the one or more generative models may comprise one or more system parameters and one or more latent parameters. The method 1100 may then continue at block 1140 with the one or more processing devices (e.g., electronic device coupled with prediction system 100) determining a set of time-lapsed predicted coordinates of the touch input with respect to the HID based on the delta change. For example, in particular embodiments, the set of time-lapsed predicted coordinates are an estimate of the set of actual coordinates. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for determining a set of predicted coordinates of a touch input including the particular steps of the method of FIG. 11, this disclosure contemplates any suitable method for determining a set of predicted coordinates of a touch input including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Systems and Methods

Figure 12:
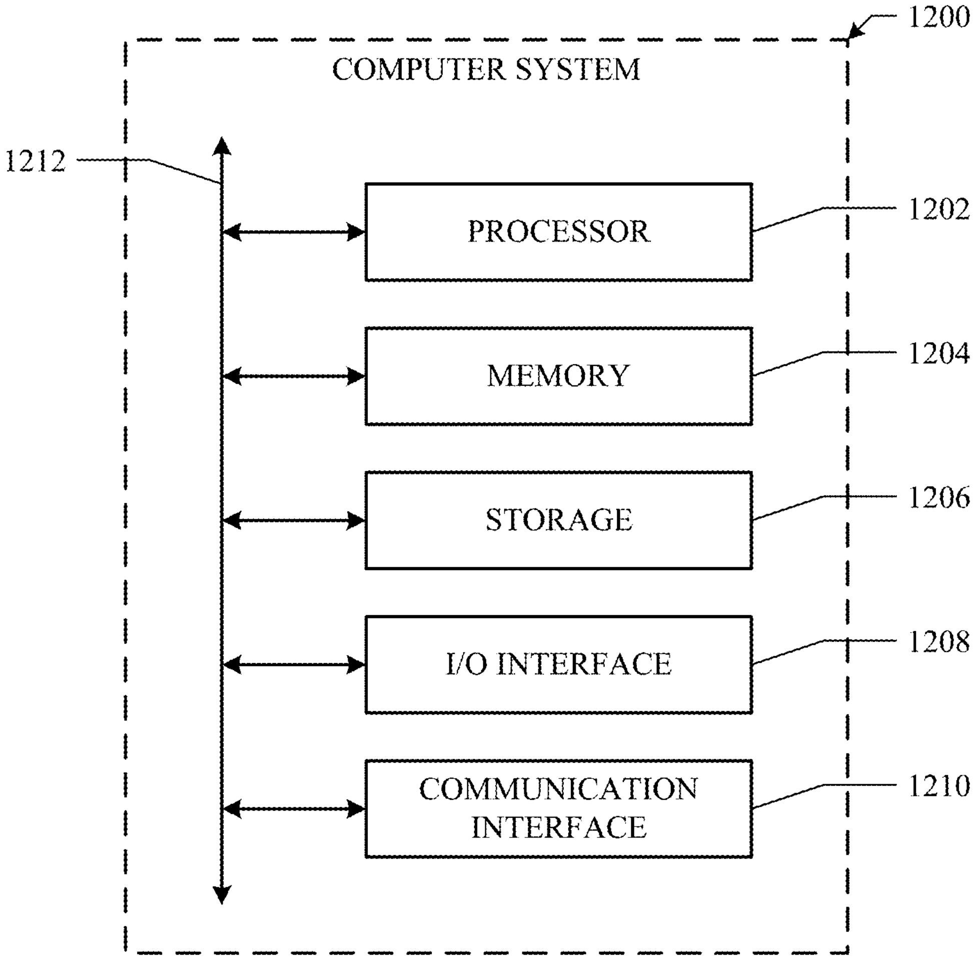
FIG. 12 illustrates an example computer system.

FIG. 12 illustrates an example computer system 1200 that may be utilized to perform determining a set of predicted coordinates of a touch input, in accordance with the presently disclosed embodiments. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks.

Where appropriate, one or more computer systems 1200 may perform without substantial spatial or temporal limitation one or more steps of one or more methods described or illustrated herein. As an example, and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement. In particular embodiments, processor 1202 includes hardware for executing instructions, such as those making up a computer program. As an example, and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example, and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202.

Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example, and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere).

One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memory devices 1204, where appropriate. Although this disclosure describes and illustrates particular memory, this disclosure contemplates any suitable memory.

In particular embodiments, storage 1206 includes mass storage for data or instructions. As an example, and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206.

Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1206 for them. Where appropriate, I/O interface 1208 may include one or more device or software drivers enabling processor 1202 to drive one or more of these I/O devices. I/O interface 1208 may include one or more I/O interfaces 1206, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it.

As an example, and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example, and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

AI Architecture

Figure 13:
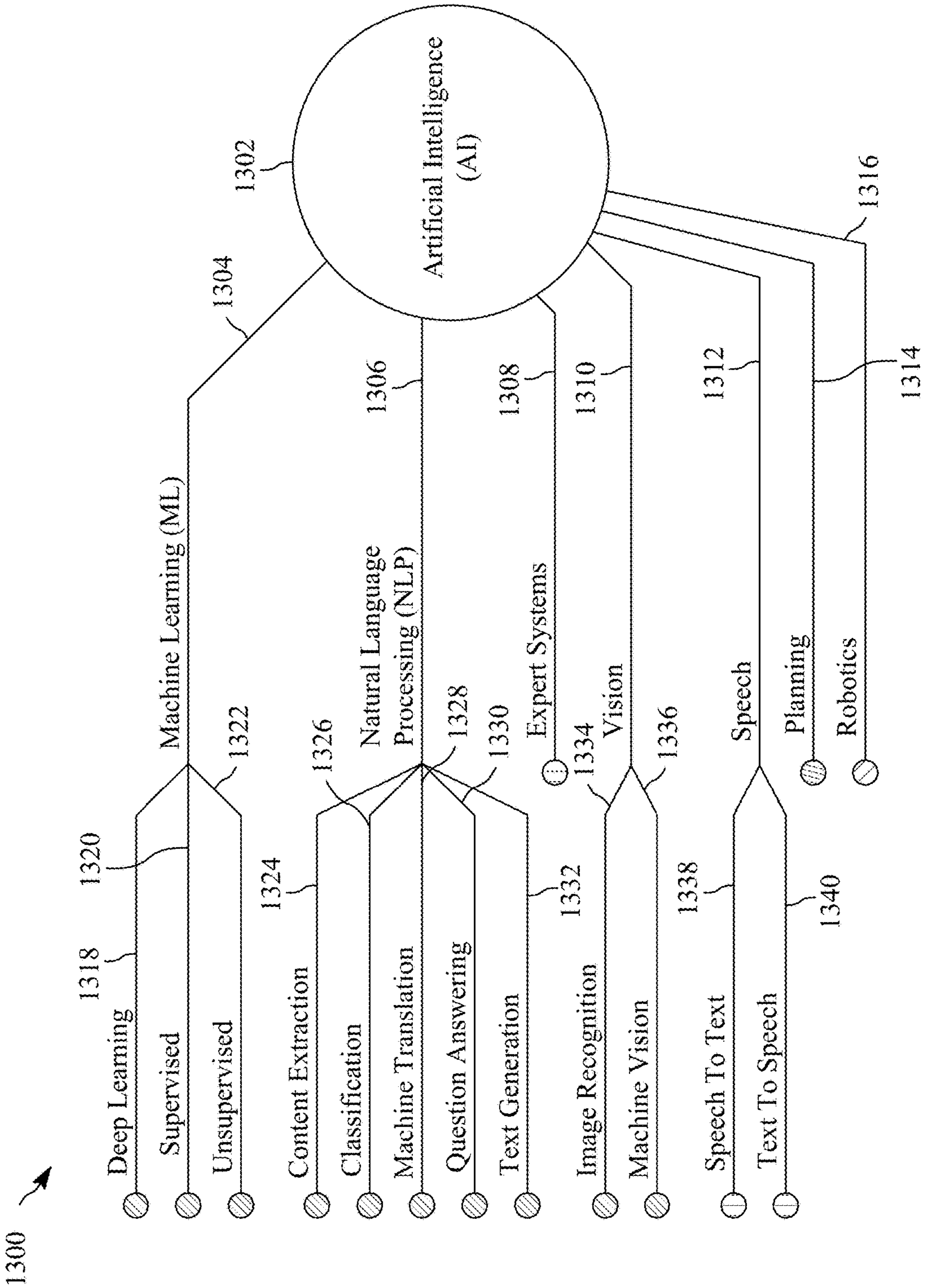
FIG. 13 illustrates a diagram of an example artificial intelligence (AI) architecture.

FIG. 13 illustrates a diagram 1300 of an example artificial intelligence (AI) architecture 1302 that may be utilized to perform determining a set of predicted coordinates of a touch input, in accordance with the presently disclosed embodiments. In particular embodiments, the AI architecture 1302 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 13, the AI architecture 1302 may include machine leaning (ML) algorithms and functions 1304, natural language processing (NLP) algorithms and functions 1306, expert systems 1308, computer-based vision algorithms and functions 1310, speech recognition algorithms and functions 1312, planning algorithms and functions 1314, and robotics algorithms and functions 1316. In particular embodiments, the ML algorithms and functions 1304 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 1304 may include deep learning algorithms 1318, supervised learning algorithms 1320, and unsupervised learning algorithms 1322.

In particular embodiments, the deep learning algorithms 1318 may include any artificial neural networks (ANNs) that may be utilized to learn deep levels of representations and abstractions from large amounts of data. For example, the deep learning algorithms 1318 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 1320 may include any algorithms that may be utilized to apply, for example, what has been learned in the past to new data using labeled examples for predicting future events. For example, starting from the analysis of a known training dataset, the supervised learning algorithms 1320 may produce an inferred function to make predictions about the output values. The supervised learning algorithms 1320 can also compare its output with the correct and intended output and find errors in order to modify the supervised learning algorithms 1320 accordingly. On the other hand, the unsupervised learning algorithms 1322 may include any algorithms that may applied, for example, when the data used to train the unsupervised learning algorithms 1322 are neither classified or labeled. For example, the unsupervised learning algorithms 1322 may study and analyze how systems may infer a function to describe a hidden structure from unlabeled data.

In particular embodiments, the NLP algorithms and functions 1306 may include any algorithms or functions that may be suitable for automatically manipulating natural language, such as speech and/or text. For example, in particular embodiments, the NLP algorithms and functions 1306 may include content extraction algorithms or functions 1324, classification algorithms or functions 1326, machine translation algorithms or functions 1328, question answering (QA) algorithms or functions 1330, and text generation algorithms or functions 1332. In particular embodiments, the content extraction algorithms or functions 1324 may include a means for extracting text or images from electronic documents (e.g., webpages, text editor documents, and so forth) to be utilized, for example, in other applications.

In particular embodiments, the classification algorithms or functions 1326 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 1328 may include any algorithms or functions that may be suitable for automatically converting source text in one language, for example, into text in another language. The QA algorithms or functions 1330 may include any algorithms or functions that may be suitable for automatically answering questions posed by humans in, for example, a natural language, such as that performed by voice-controlled personal assistant devices. The text generation algorithms or functions 1332 may include any algorithms or functions that may be suitable for automatically generating natural language texts.

In particular embodiments, the expert systems 1308 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 1310 may include any algorithms or functions that may be suitable for automatically extracting information from images (e.g., photo images, video images). For example, the computer-based vision algorithms and functions 1310 may include image recognition algorithms 1334 and machine vision algorithms 1336. The image recognition algorithms 1334 may include any algorithms that may be suitable for automatically identifying and/or classifying objects, places, people, and so forth that may be included in, for example, one or more image frames or other displayed data. The machine vision algorithms 1336 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 1312 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 1338 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 1340 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:

receiving sensor data indicative of a touch input from one or more sensors of a human interface-device (HID) of the electronic device, wherein the touch input occurs at a set of actual coordinates with respect to the HID, and wherein the sensor data indicates the touch input occurs at a set of detected coordinates with respect to the HID, wherein the set of detected coordinates is different from the set of actual coordinates, wherein the sensor data indicative of a touch input, the set of actual coordinates, and the set of detected coordinates each comprise a sequence of locations on the HID, each location in the sequence corresponding to a particular time;

determining a context associated with the touch input;

determining, by one or more generative models, context-dependent statistics to apply a delta change to the set of detected coordinates, wherein the context-dependent statistics are based on the context associated with the touch input, and wherein the one or more generative models comprises one or more system parameters and one or more latent parameters, and wherein the delta change corresponds to at least one first location in the sequence of locations of the set of detected coordinates, and the delta change corresponding to the at least one first location is determined based at least on one or more other locations in the sequence of locations of the set of detected coordinates; and determining a set of time-lapsed predicted coordinates of the touch input with respect to the HID based on the delta change, wherein the set of time-lapsed predicted coordinates are an estimate of the set of actual coordinates.

2. The method of claim 1, further comprising:

storing the sensor data in a buffer, wherein the buffer is used to remove signal noise associated with the set of detected coordinates from the sensor data, and wherein the context is determined based on the stored data.

3. The method of claim 1, wherein the one or more sensors of the HID are positioned in a pattern on the HID where a first subset of sensors of the one or more sensors are positioned at least a threshold distance away from a second subset of sensors of the one or more sensors.

4. The method of claim 3, wherein the pattern comprises a stripe pattern, where the first subset of sensors and the second subset of sensors are positioned along parallel lines with respect to the HID.

5. The method of claim 1, further comprising:

injecting a plurality of signals into the one or more sensors, wherein the plurality of signals comprise at least a first signal at a first frequency and a second signal at a second frequency; and detecting, by the one or more sensors, a plurality of attenuated measured signals based on the touch input interfacing the plurality of signals, wherein the plurality of attenuated measured signals are used to generate the sensor data.

6. The method of claim 1, wherein the one or more sensors comprises one or more of a capacitive sensor or a resistive sensor.

7. The method of claim 1, further comprising:

displaying, on the HID, an indication of the set of predicted coordinates of the touch input in real-time.

8. An electronic device comprising:

one or more displays;

one or more non-transitory computer-readable storage media including instructions; and one or more processors coupled to the storage media, the one or more processors configured to execute the instructions to:

receive sensor data indicative of a touch input from one or more sensors of a human interface-device (HID) of the electronic device, wherein the touch input occurs at a set of actual coordinates with respect to the HID, and wherein the sensor data indicates the touch input occurs at a set of detected coordinates with respect to the HID, wherein the set of detected coordinates is different from the set of actual coordinates, wherein the sensor data indicative of a touch input, the set of actual coordinates, and the set of detected coordinates each comprise a sequence of locations on the HID, each location in the sequence corresponding to a particular time;

determine a context associated with the touch input;

determine, by one or more generative models, context-dependent statistics to apply a delta change to the set of detected coordinates, wherein the context-dependent statistics are based on the context associated with the touch input, and wherein the one or more generative models comprises one or more system parameters and one or more latent parameters, and wherein the delta change corresponds to at least one first location in the sequence of locations of the set of detected coordinates, and the delta change corresponding to the at least one first location is determined based at least on one or more other locations in the sequence of locations of the set of detected coordinates; and determine a set of time-lapsed predicted coordinates of the touch input with respect to the HID based on the delta change, wherein the set of time-lapsed predicted coordinates are an estimate of the set of actual coordinates.

9. The electronic device of claim 8, wherein the processors are further configured to execute the instructions to:

store the sensor data in a buffer, wherein the buffer is used to remove signal noise associated with the set of detected coordinates from the sensor data, and wherein the context is determined based on the stored data.

10. The electronic device of claim 8, wherein the one or more sensors of the HID are positioned in a pattern on the HID where a first subset of sensors of the one or more sensors are positioned at least a threshold distance away from a second subset of sensors of the one or more sensors.

11. The electronic device of claim 10, wherein the pattern comprises a stripe pattern, where the first subset of sensors and the second subset of sensors are positioned along parallel lines with respect to the HID.

12. The electronic device of claim 8, wherein the processors are further configured to execute the instructions to:

inject a plurality of signals into the one or more sensors, wherein the plurality of signals comprise at least a first signal at a first frequency and a second signal at a second frequency; and detect, by the one or more sensors, a plurality of attenuated measured signals based on the touch input interfacing the plurality of signals, wherein the plurality of attenuated measured signals are used to generate the sensor data.

13. The electronic device of claim 8, wherein the one or more sensors comprises one or more of a capacitive sensor or a resistive sensor.

14. The electronic device of claim 8, wherein the processors are further configured to execute the instructions to:

display, on the HID, an indication of the set of predicted coordinates of the touch input in real-time.

15. A computer-readable non-transitory storage media comprising instructions executable by a processor to:

receive sensor data indicative of a touch input from one or more sensors of a human interface-device (HID) of the electronic device, wherein the touch input occurs at a set of actual coordinates with respect to the HID, and wherein the sensor data indicates the touch input occurs at a set of detected coordinates with respect to the HID, wherein the set of detected coordinates is different from the set of actual coordinates, wherein the sensor data indicative of a touch input, the set of actual coordinates, and the set of detected coordinates each comprise a sequence of locations on the HID, each location in the sequence corresponding to a particular time;

determine a context associated with the touch input;

determine, by one or more generative models, context-dependent statistics to apply a delta change to the set of detected coordinates, wherein the context-dependent statistics are based on the context associated with the touch input, and wherein the one or more generative models comprises one or more system parameters and one or more latent parameters, and wherein the delta change corresponds to at least one first location in the sequence of locations of the set of detected coordinates, and the delta change corresponding to the at least one first location is determined based at least on one or more other locations in the sequence of locations of the set of detected coordinates; and determine a set of time-lapsed predicted coordinates of the touch input with respect to the HID based on the delta change, wherein the set of time-lapsed predicted coordinates are an estimate of the set of actual coordinates.

16. The media of claim 15, wherein the instructions are further executable by the processor to:

store the sensor data in a buffer, wherein the buffer is used to remove signal noise associated with the set of detected coordinates from the sensor data, and wherein the context is determined based on the stored data.

17. The media of claim 15, wherein the one or more sensors of the HID are positioned in a pattern on the HID where a first subset of sensors of the one or more sensors are positioned at least a threshold distance away from a second subset of sensors of the one or more sensors.

18. The media of claim 17, wherein the pattern comprises a stripe pattern, where the first subset of sensors and the second subset of sensors are positioned along parallel lines with respect to the HID.

19. The media of claim 15, wherein the instructions are further executable by the processor to:

inject a plurality of signals into the one or more sensors, wherein the plurality of signals comprise at least a first signal at a first frequency and a second signal at a second frequency; and detect, by the one or more sensors, a plurality of attenuated measured signals based on the touch input interfacing the plurality of signals, wherein the plurality of attenuated measured signals are used to generate the sensor data.

20. The media of claim 15, wherein the one or more sensors comprises one or more of a capacitive sensor or a resistive sensor.

* * * * *